United States Patent Office 3,149,882
Patented Sept. 22, 1964

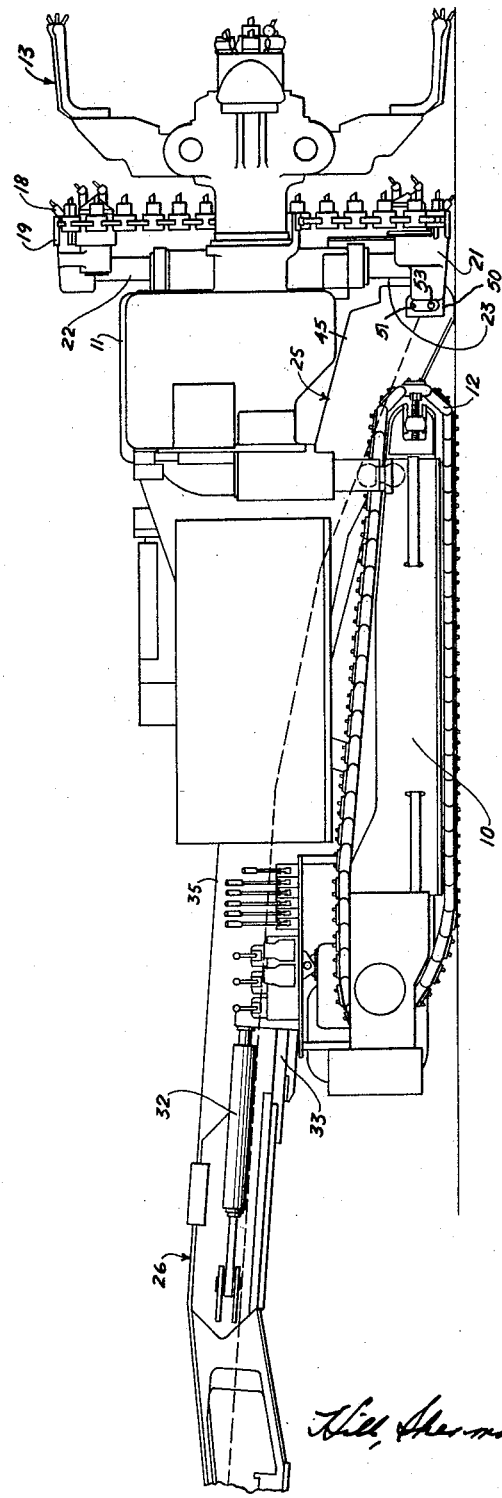

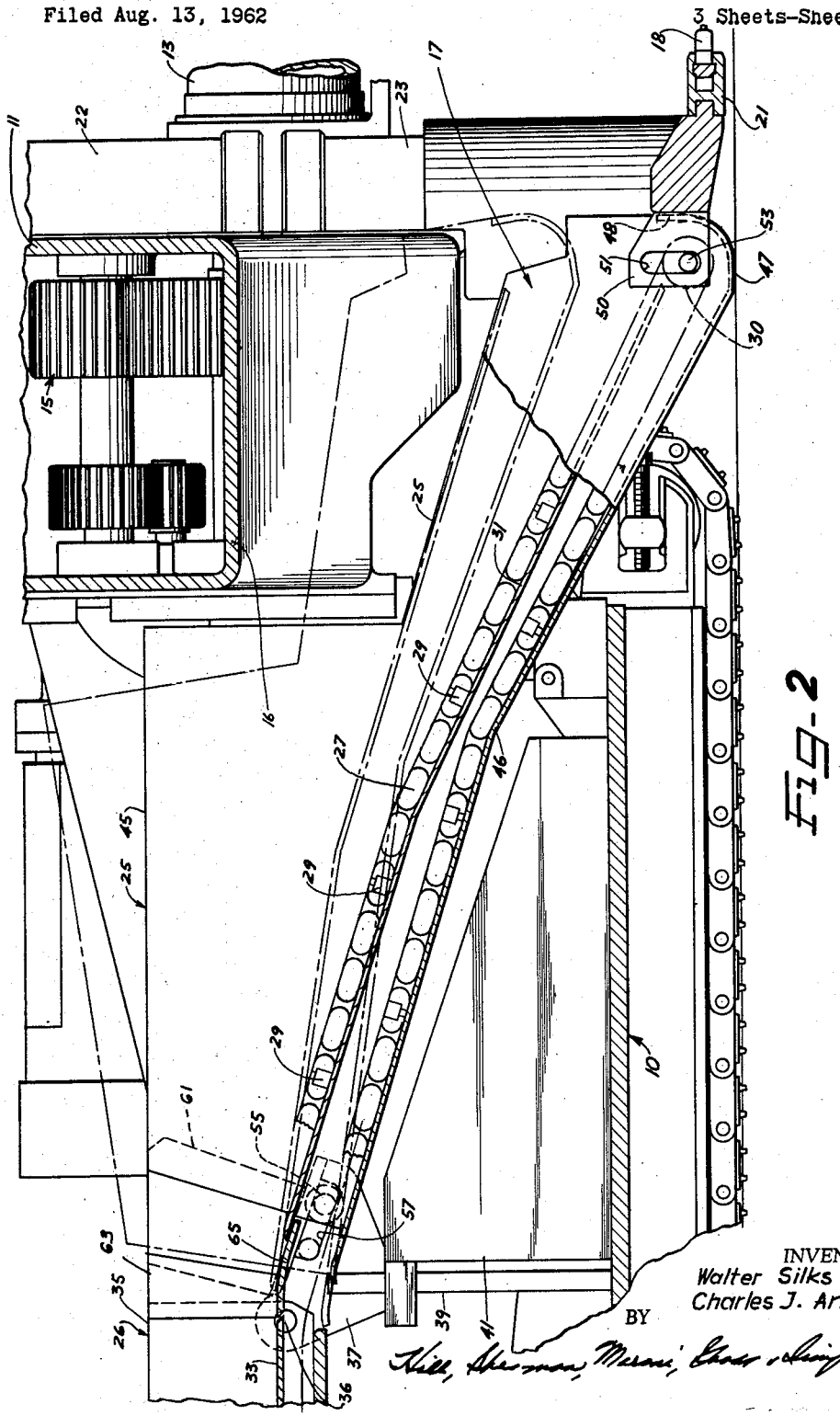

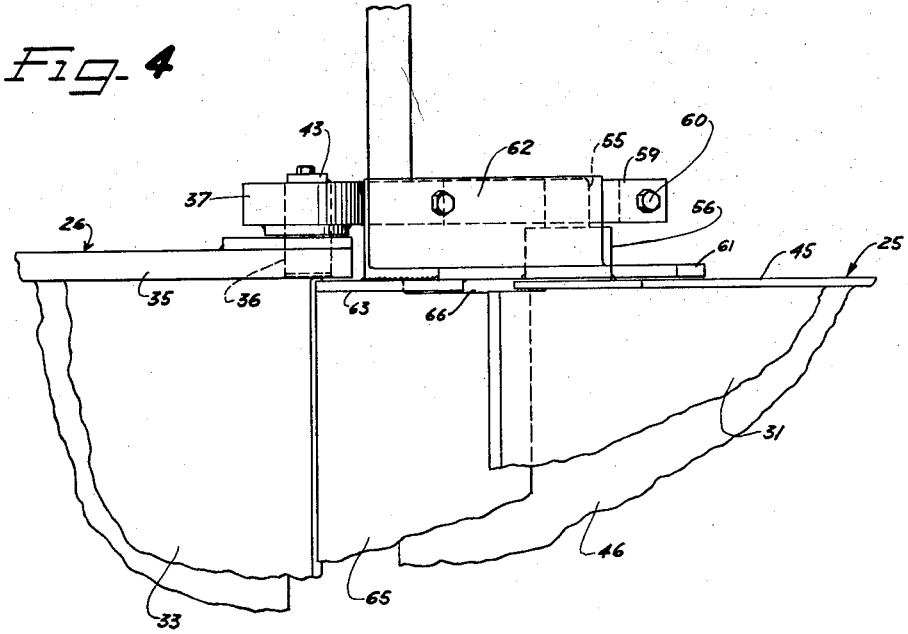

1

3,149,882
CONVEYOR STRUCTURE FOR CONTINUOUS
MINING MACHINES
Walter Silks, Downers Grove, and Charles J. Arndt,
Harvey, Ill., assignors to Goodman Manufacturing
Company, Chicago, Ill., a corporation of Illinois
Filed Aug. 13, 1962, Ser. No. 216,369
4 Claims. (Cl. 299—56)

This invention relates to improvements in continuous mining machines of the multiple boring type and more particularly relates to an improved conveyor structure for such machines.

A principal object of the present invention is to provide a simpler and more reliable elevating conveyor structure for continuous mining machines and the like, arranged with a view towards utmost simplicity in construction and flexibility in operation.

Another object of the invention is to improve upon the conveyor structures for continuous mining machines of the boring type having a lower vertically adjustable trimmer bar for cutting along a mine floor, in which the conveyor structure is so arranged as to accommodate free vertical adjustment of the trimmer bar for various cutting heights without interfering with the operation of the conveyor, and to accommodate the trimmer bar to elevate the conveyor above the ground for tramming.

A further object of the invention is to improve upon the conveyor structures of continuous mining machines and the like by transversely pivoting the inclined elevating sections of the conveyor adjacent the transverse pivot for the discharge end section of the conveyor, to provide for angular movement of the elevating section of the conveyor during the mining and loading operation in a controlled path and to accommodate retraction of the pivot to relieve tension on the conveyor chain when elevating the inclined elevating section of the conveyor for tramming.

A still further object of the invention is to simplify the construction of the conveyors of continuous mining machines by eliminating the usual adjustable front section of the conveyor and instead providing a one piece front section pivoted close to the pivot for the discharge section of the conveyor, in which the pivot is a substantially fixed pivot during the operation of mining, as the conveyor follows the mine floor, and is retractible when lifting the conveyor for tramming, to relieve the conveyor chain from excessive tension.

These and other objects of the invention will appear from time to time as the following specification proceeds and with reference to the accompanying drawings wherein:

FIGURE 1 is a view in side elevation of a continuous mining machine of the boring type constructed in accordance with a preferred embodiment of the invention;

FIGURE 2 is an enlarged partial fragmentary sectional view taken longitudinally through the forward end portion of the machine;

FIGURE 3 is a fragmentary view in side elevation of the forward end portion of the machine with certain parts shown in longitudinal section and certain other parts broken away; and FIGURE 4 is a partial fragmentary enlarged plan view of the conveyor at the juncture of the inclined elevating section of the conveyor with the laterally swingable discharge section of the conveyor, in order to show certain details of the support and closure means between the two sections of the conveyor.

In FIGURE 1 of the drawings, 10 generally designates a mobile base or main frame of the continuous mining machine, having a cutter frame 11 adjustably supported thereon and extending in advance thereof, and mounted on the main frame 10 for vertical adjustment with respect thereto, and for angular adjustment about axes extending longitudinally and transversely of said main frame.

The main frame 10 is supported on conventional laterally spaced continuous traction tread devices 12, which serve to transport the machine along the ground from working place to working place and to feed boring heads 13, mounted on and projecting forwardly of the cutter frame 11, to cut contiguous bores in the working face, in a conventional manner, so not herein shown or described further.

The cutter frame 11 besides forming a support for the rotary boring heads 13, forms a housing for drive gearing indicated generally by reference character 15, for driving the boring heads 13 to rotate together toward each other along the ground and away from each other along the mine roof. The drive gearing 15 is driven from a motor (not shown), which may be mounted on the main frame. The cutter frame 11 also has a downwardly opening throat 16 between the boring heads 13 and opening to a conveyor 17 for gathering the mined material and conveying the mined material for discharge onto a shuttle car, room conveyor or other material carrying device, for carrying the mined material away from the machine.

The cusps left between the boring heads 13 and depending from the mine roof and extending upwardly from the mine floor are cut away by an endless trimmer chain 18 guided for movement along the mine roof in an upper trimmer bar 19 and for movement along the mine floor in a lower trimmer bar 21. The trimmer chain is driven from the drive gearing 15 in a conventional manner, so not herein shown or described further. The upper trimmer bar 19 is supported in advance of the cutter frame 11 and rearwardly of the boring heads 13 on parallel spaced vertically extending hydraulic jacks 22. The lower trimmer bar 21 is supported in depending relation with respect to the cutter frame 11 and is adjustably moved with respect to the ground and held in fixed positions for cutting, by spaced parallel hydraulic jacks 23.

The conveyor 17 may be a conventional form of laterally flexible center strand endless chain and flight conveyor and includes an inclined elevator section 25 terminating at its rear end in a laterally swingable discharge section 26 extending beyond the rear end of the machine. A laterally flexible center strand endless chain 27 having flights 29 projecting from opposite sides thereof extends about an idler 30 at the front end of the elevating section 25 and upwardly along a material carrying plate 31, to and along the laterally flexible discharge section 26 about a drive sprocket (not shown) at the rear end of said discharge section. The drive sprocket is driven from a suitable motor (not shown) in a conventional manner.

A hydraulic jack 32 connected between the main frame 10 and discharge trough section 26 is provided to center said discharge trough section with respect to the center line of the machine and to laterally swing said trough section to one side or the other of center, to position the discharge end of said trough section in material discharge relation with respect to shuttle cars, a room conveyor, or other suitable material carrying devices for conveying the material away from the machine during the mining operation.

The discharge conveyor section 26 includes generally a material carrying plate 33 having parallel spaced side walls 35 extending along opposite sides thereof. The side walls 35 have the usual flexible side walls guided for movement therealong to provide a continuous trough as the discharge end of the conveyor is swung to one side or the other of center. The side walls 35 are shown in Figure 4 as having pivot pins 36 extending outwardly therefrom adjacent the lower forward end portions thereof. The pivot pins 36 are pivotally mounted in bracket members 37, mounted on the upper end of a transverse vertical plate 39, welded or otherwise secured to a base plate 40 of the main frame 10 and extending upwardly therefrom. The plate 39 extends parallel to the rear end wall of a storage tank 41 for hydraulic fluid, forming a source of supply of hydraulic fluid, to effect operation of the various operative parts of the machine and is suitably braced thereto. The bracket members 37 extend along opposite sides of the discharge conveyor section 26 forwardly along the rear end portion of the inclined elevating conveyor section 25. Locking plates 43, secured to the outer faces of the bracket members 37 and abutting the outer ends of the shafts 36 are provided to retain the shaft 36 in position in the bracket members 37.

The inclined elevating section 25 of the conveyor includes parallel spaced side walls 45 extending along opposite sides of the material carrying plate 31, above and below said plate and connected at their lower ends to a bottom plate 46 forming a support for the return run of the conveyor. The bottom plate 46 extends downwardly beneath the idler 30 and has a relatively flat ground engaging surface 47 beneath said idler, forming a shoe for supporting the inclined conveyor section 25 for movement along the ground. From the ground engaging surface 47, the forward end portion of the plate 46 extends upwardly in advance of the idler 30, to retain the mined material to said conveyor and accommodate the flights 29 to pick up the loose material discharged in the space between the direction changing idler 30 and the upright plate 48.

The cutter bar 21 has a pair of parallel spaced ears 50 extending rearwardly therefrom along opposite sides of the elevating conveyor section 25. The ears 50 have vertical slots 51 therein slidably receiving bearing pins 53, extending laterally from the side plates 45 coaxial with the axis of rotation of the direction changing idler 30. The bearing pins 53 may be continuations of the shaft for supporting the direction changing idler 30.

During the operation of loading when the cutter bar 21 is positioned to position the trimmer chain 18 to cut along the ground, the ground engaging portion 47 of the conveyor, riding along the ground, may move the elevating section of the conveyor vertically in a controlled path controlled by the bearing pins 53 movable along the vertical slots 51. If, however, it should be desired to tram the machine to a new working place, the trimmer bar 21 is elevated by operation of the hydraulic jacks 23 and the bearing pins 53 engaging the bottoms of the slots 51 lift the elevating conveyor section 25 above the ground to the broken line position shown in Figure 2 and the solid line position shown in Figure 3.

The rear pivot for the elevating conveyor section 25 includes laterally extending pivot pins 55 extending from opposite sides of the elevating conveyor section 25, at the rear end thereof. As shown in Figure 4, a boss 56 is mounted on the outer side of each side wall 45 adjacent the lower end portion thereof and forms a mounting for an associated pivot pin 55. Each pivot pin 55 is slidably movable along an upwardly opening slot 57 extending along the upper end portion of the connector bracket 37 in advance of the plate 39. The slot 57 extends in the general angle of inclination of the conveyor and is closed by a cap 59 extending along the top of the slot 57 and secured to the connector bracket 37, as by machine screws 60.

Closure means are provided to close the gaps between the side plates 45, 45, and 35, 35 in all positions of vertical adjustment of the conveyor sections 25, and 26 with respect to each other. The closure means for each side of the conveyor, as shown in Figures 2, 3 and 4 comprises a closure plate 61 having an outwardy extending right angled base 62 extending along the top of the cap 59 and welded or otherwise secured thereto. The closure plate 61 is slidably engaged by the outer side of an associated plate 45 of the conveyor section 25. The closure plate 61 has a gap closing plate 63 welded or otherwise secured to the inner side thereof and extending along the inside of the associated side wall 35 of the discharge conveyor section 26, and accommodating movement of said discharge conveyor section about the pivot pins 36 into engagement with the rear end portion of the closure plate 61.

The gap between the material carrying plates 31 and 33 is closed by a crown plate 65 extending forwardly of the material carrying plate 33 of the conveyor section 26, and crowned or inclined to generally conform to the angle of inclination of the upper end portion of the material carrying plate 31. The crown plate 65 extends under the discharge end portion of the material carrying plate 31, to accommodate the loose material to be continuously carried from the material carrying plate 31 to the material carrying plate 33 in the various positions of vertical adjustment of said plates with respect to each other.

The crown plate 65 may be welded or otherwise secured to the closure plates 63 and is cut away along opposite sides thereof to form a slot 66 at each side of said crown plate to receive the side walls 45 of the conveyor section 25 as said conveyor section is elevated by elevation of the cutter bar 18.

By the construction just described, a transverse pivot is provided for the entire inclined elevating section of the conveyor, accommodating the conveyor to ride along and freely conform to the mine bottom under the control of the pins 53 and slots 51, effecting a slight movement of the pins 55 along the slots 57 during mining but not sufficient movement to place undue slack on the chain.

It may also be seen that as the cutter bar 18 elevates the inclined conveyor section 25 for tramming, the slots 51 will move the pins 53 and forward end portion of the inclined elevating section of the conveyor vertically in a linear path and effect movement of the pins 55 in the slots 57 to the extreme positions shown in Figure 3, when the front section of the conveyor is in the extreme elevated position shown in this figure. While the chain will be slack when in the elevated position shown by solid lines in Figure 3 and by broken lines in Figure 2, the chain can be slack in this position without damaging the chain, since the conveyor is not in operation.

While we have herein shown and described one form in which our invention may be embodied, it may readily be understood that various modifications and variations in the invention may be attained without departing from the spirit and scope of the novel concepts thereof as defined by the claims appended hereto.

We claim as our invention:

1. In a continuous mining machine, a base frame, a cutter frame disposed above said base frame and mounted on the forward end of said base frame and extending in advance thereof, a horizontally disposed lower trimmer bar depending from said cutter frame and extending across the forward end of said base frame and mounted on said cutter frame for vertical adjustable movement with respect thereto, a conveyor extending along said base frame, said conveyor including a rear discharge trough section having parallel spaced side walls and a material carrying plate extending therebetween, and also including an inclined elevating trough section having parallel spaced side walls having an inclined material carrying plate extending therebetween and an endless chain and flight conveyor movable along said material carrying plates from the forward to the rear end of the conveyor, a vertical pin and slot connection between said trimmer bar and the forward end of said inclined elevating trough section, accommodating free up and down movement of said inclined elevating trough section during mining and elevating said inclined elevating trough section by elevation of said trimmer bar, a slidable support for the rear end of said inclined elevating trough section including spaced connector brackets mounted on said base frame and extending along opposite sides of said inclined elevating trough section, transverse pin and longitudinally extending slot connections between the rear end portions of said side walls of said inclined elevating trough section and said connector brackets retaining said inclined elevating trough section to said connector brackets and accommodating vertical movement of said inclined elevating trough section under the control of said vertical pin and slot connection, means supported on said connector brackets and closing the gap between said inclined elevating trough section and said rear discharge trough section comprising closure plate means extending along the insides of the side walls of said rear discharge trough section and forwardly therefrom and having slidable engagement with the side walls of said inclined elevating trough section, and a stationary plate extending between said closure plate means forwardly of said bottom plate of said rear discharge trough section and underlying said bottom plate of said inclined elevating trough section, 2. In a continuous mining machine, a base frame, a cutter frame disposed above said base frame and mounted on the forward end of said base frame and extending in advance thereof, a horizontally disposed lower trimmer bar, hydraulic jack means suspending said trimmer bar from said cutter frame and adjustably moving said trimmer bar toward and from said cutter frame, a conveyor including a rear discharge trough section extending beyond the rear end of said base frame and having side walls and a material carrying plate connecting said side walls together, and also including a front elevating trough section extending forwardly of said rear trough section toward the ground and having parallel spaced side walls and a material carrying plate connecting said side walls together, laterally spaced connector brackets mounted on said base frame and extending upwardly therefrom along the outer sides of said side walls of said rear discharge trough section and said front elevating trough section and forming a support for the forward end portion of said rear discharge trough section, a stationary closure plate forming a forward continuation of said material carrying plate of said rear discharge trough section and underlapping said material carrying plate of said inclined elevating trough section, means mounting said closure plate between said brackets to extend across and forwardly of the forward end of said discharge trough section, stationary vertical closure walls extending upwardly of opposite sides of said closure plate along the insides of the side walls of said rear discharge trough section and of said front elevating trough section, a vertically extending pin and slot connection between said trimmer bar and the forward end portion of said front elevating trough section, and a longitudinally slidable retaining connection between the rear end portion of said inclined elevating trough section and said connector brackets, guiding the rear end portion of said inclined trough section for longitudinal movement in the general plane of inclination thereof and retaining said inclined trough section to said brackets for pivotal movement with respect thereto about transverse axes, upon elevation of said trimmer bar, and also retaining said material carrying plate of said front elevating trough section to said closure plate in all positions of elevation of said inclined elevating trough section with respect to said rear discharge trough section.

3. A continuous mining machine in accordance with claim 2 in which the retaining connection between the inclined elevating trough section and the connector brackets comprises slots extending along said connector brackets in a plane generally parallel to the plane of inclination of said material carrying plate of said front elevating trough section and pins extending from said side walls of said inclined elevating trough section and having slidable engagement with said slots.

4. A continuous mining machine in accordance with claim 2 in which the retaining connection between the connector brackets and the inclined trough section comprises slots extending along said connector brackets in the general plane of inclination of said inclined elevating trough section, pins extending from the side walls of said inclined elevating trough section and having slidable and pivotal engagement with said slots and slidably retained to said slots, and wherein said stationary closure plate is longitudinally slotted in registry with said side walls of said inclined elevating trough section to accommodate retractible movement of said inclined elevating trough section along said closure plate.

References Cited in the file of this patent
UNITED STATES PATENTS

| | | |
|---|---|---|
| 874,636 | Straight | Dec. 24, 1907 |
| 2,984,470 | Kraft | May 16, 1961 |